(12) United States Patent
Hendriks et al.

(10) Patent No.: US 6,510,011 B2
(45) Date of Patent: Jan. 21, 2003

(54) OPTICAL SCANNING DEVICE

(75) Inventors: Bernardus Hendrikus Wilhelmus Hendriks, Eindhoven (NL); Petrus Gerardus Josephus Maria Nuyens, Eindhoven (NL); Derk Visser, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 35 days.

(21) Appl. No.: 09/814,654

(22) Filed: Mar. 22, 2001

(65) Prior Publication Data

US 2002/0008894 A1 Jan. 24, 2002

(30) Foreign Application Priority Data

Mar. 27, 2000 (EP) .............................................. 00201098
May 11, 2000 (EP) .............................................. 00201688

(51) Int. Cl.[7] .............................. G02B 7/02; G11B 7/00
(52) U.S. Cl. ..................... 359/823; 359/803; 369/112.2
(58) Field of Search ................................. 359/823, 803, 359/824, 819; 369/112.2, 112.1, 112.23, 112.03, 112.05, 112.06, 112.07

(56) References Cited

U.S. PATENT DOCUMENTS 5,175,783 A * 12/1992 Tatoh ........................... 385/93
5,357,590 A    10/1994 Auracher ...................... 385/33

FOREIGN PATENT DOCUMENTS

| EP | 0863502 A2 | 9/1998 | ........... G11B/7/135 |
| EP | 0944049 A2 | 9/1999 | ............ G11B/7/12 |
| EP | 1041545 A1 | 10/2000 | |

* cited by examiner

Primary Examiner—Evelyn A Lester
Assistant Examiner—Tim Thompson
(74) Attorney, Agent, or Firm—Michael E. Belk

(57) ABSTRACT

The invention relates to an objective system (39) which is suitable for use in an optical scanning device (15). The lens system (39) comprises a first lens, or objective lens (45), and a second lens, or auxiliary lens (47), which are mounted in fixed positions in a lens holder (61). The objective lens comprises more than one half of a first spherical lens body (67) having a first diameter ($D_1$) and the auxiliary lens comprises more than one half of a second spherical lens body (69) having a second diameter ($D_2$) which is smaller than the first diameter. The objective lens and the auxiliary lens are surrounded by a first circular-cylindrical inner wall (83) and a second circular-cylindrical inner wall (85), respectively, of the lens holder, having a diameter which is substantially equal to the first and the second diameter, respectively. The inner walls can be provided in the lens holder in very accurate coaxial positions by use of conventional tools. In this manner, a very accurate centering of the objective lens and the auxiliary lens in the lens holder is achieved in a comparatively simple manner.

12 Claims, 4 Drawing Sheets

OPTICAL SCANNING DEVICE

The invention relates to an optical scanning device for scanning an information layer of an optically readable record carrier, which scanning device comprises a radiation source and an objective system with an optical axis for focusing a radiation beam, supplied in operation by the radiation source, to a scanning spot on the information layer, the objective system being provided with a first lens comprising a part of a first, substantially spherical lens body with a first center and a first diameter, and a second lens comprising a part of a second, substantially spherical lens body with a second center and a second diameter which is smaller than the first diameter, the first and the second center being situated substantially on the optical axis.

The invention also relates to an objective system comprising such a first and a second lens.

The invention further relates to an optical player provided with a table which is movable in a given direction of movement, an optical scanning device for scanning an information layer of an optically readable record carrier which can be placed on the table, and a displacement device with which at least an objective system of the scanning device is movable in a direction substantially perpendicular to the direction of movement of the table.

BACKGROUND OF THE INVENTION

An optical scanning device, a player in which the optical scanning device is used, and an objective system used in the scanning device of the types described in the opening paragraphs are known from EP-A 0 944 049. The first lens of the known objective system is an objective lens and the second lens is an auxiliary lens which is arranged between the objective lens and the record carrier to be scanned. By using the second lens, the known lens system has a relatively large numerical aperture so that a relatively small scanning spot is provided on the record carrier to be scanned. The second lens comprises more than half of the second spherical lens body in order to form the scanning spot at a distance $r/n$ from the second center in the direction of the record carrier, in which r is the radius of the second lens body and n is the refractive index of the material of the second lens body. This displacement of the position of the scanning spot yields a further increase of the numerical aperture. Thus, the known scanning device is suitable for scanning record carriers having relatively small elementary information characteristics, i.e. record carriers having a relatively large information density such as, for example, a high-density CD. Since the objective system has a free working distance which is smaller than the wavelength of the radiation, the lens bodies and their mutual positions have relatively wide tolerances.

BRIEF SUMMARY OF THE INVENTION

A drawback of the known objective system, the known optical scanning device and the known optical player is that the desired optical quality of the objective system is only achieved with relatively great trouble in spite of said wide tolerances. At a larger free working distance, the tolerances become considerably stricter and the desired optical quality is even more difficult to achieve.

It is an object of the invention to provide an objective system, an optical scanning device and an optical player of the types described in the opening paragraphs, in which the desired optical quality can be achieved with less trouble.

To achieve this object, a scanning device according to the invention is characterized in that the first and the second lens comprise more than one half of the first and the second spherical lens body, respectively. The invention is based on the recognition that the optical quality of an objective system with two lenses is greatly dependent on the mutual positioning of the two lenses. The optical axes of the separate lenses should coincide within predetermined relatively small tolerances. Viewed in directions perpendicular to the optical axis of the objective system, the optical axes of the lenses should therefore have accurate positions with respect to each other and should accurately be parallel to each other. The alignment of the known objective system is relatively difficult because the provision of positioning faces on the two lenses with the desired accuracy is a very elaborate process. However, when a lens comprises more than half a spherical lens body, the ball zone, i.e. the outer side of the lens body is found to form a very satisfactory positioning face around the large circle perpendicular to the optical axis. Moreover, spherical lens bodies can be manufactured in a very accurate way by means of relatively simple processes such as, for example, a rolling process. Due to the spherical shape of the lens, the position of the outer side of the lens body with respect to the center is very well defined, so that the desired accuracy of the mutual positions can be realized in a relatively easy way.

An additional advantage of such a lens body is that, after positioning in a fitting, the lens is still tiltable in the fitting through limited angles around the center of the lens body without the position of the lens, viewed perpendicularly to the centerline of the fitting, being influenced. The direction of the optical axis of the lens, passing through the center of the lens body, is thereby adjustable. The edge of the lens body where the spherical shape merges into a relatively flat portion is relatively rough due to the manufacture of the flat portion, for example due to grinding and polishing of the flat portion. When, during the process of joining the lens system, the rough edge of the lens body comes in contact with the inner wall of the fitting, or when its rough edge engages the inner wall after the process of joining, it is possible that the lens body will get out of center or even gets stuck. The lens bodies according to the invention do not have this problem because the rough edge is remote from the positioning face engaging the inner wall.

When both the first and the second lens of the objective system comprise more than half of a spherical lens body, the centers of the first and second lens can be positioned with great accuracy on the centerline of the fitting or fittings, and, moreover, the optical axes of the first and the second lens can be accurately rendered parallel to each other. Due to the relatively simple alignment of the first and the second lens, the desired optical quality of the objective system can be achieved with relatively little trouble.

The thickness on the optical axis of the first and the second spherical body is preferably larger than 1.01 times the radius of the spherical body. In that case, the engagement of the lens body with the inner wall of the fitting remains satisfactory when, during the process of joining the lens system, the optical axis of one of the lenses extends at an angle of 0.5° to the centerline of the fitting. The difference between the thickness and the radius of the lens body is preferably larger than the manufacturing tolerance of the thickness.

A particular embodiment of a scanning device according to the invention is characterized in that at least one of the first and the second lens is bounded on one side by a boundary face extending perpendicularly to the optical axis. A spherical lens body can be provided relatively easily with an accurately positioned, plane boundary face within narrow tolerances. The boundary face should be plane only in an accurate way, with the optical axis of the lens being formed by the centerline of the lens body which is perpendicular to the boundary face. Such a lens can be aligned easily and accurately on an abutment of a fitting. When the abutment extends in a plane perpendicular to the centerline of the fitting, the optical axis of the lens will be accurately parallel to the centerline. Said abutment should be provided perpendicularly to the centerline of the fitting in an accurate manner, which can be done in a relatively simple manner by means of conventional tools such as, for example, a lathe. When both the first and the second lens are provided with a boundary face extending perpendicularly to the optical axis, it is relatively easy to render the optical axes of the two lenses substantially parallel.

The first and the second lens may be fixed in a first and a second fitting, respectively, which can be displaced with respect to each other in the direction of the optical axis. When the two fittings are accurately aligned with respect to each other, the optical axes of the lenses will also coincide accurately. A particular embodiment of a scanning device according to the invention is, however, characterized in that the first and the second lens are secured in a fixed position with respect to each other. Consequently, both lenses can be fixed in a single lens holder comprising a first and a second fitting for the first and the second lens, respectively. It is relatively simple to cause the centerline of the first fitting and the centerline of the second fitting in such a lens holder to coincide within small tolerances. The inner walls of the fittings may be provided with projecting ribs engaging the spherical outer sides of the lens bodies. However, the inner walls are preferably substantially circular-cylindrical with a common centerline. This can be realized in a relatively simple manner by providing the first and the second fitting of the lens holder with the first and the second circular-cylindrical inner wall, respectively, by means of conventional tools such as, for example, a lathe.

A further embodiment of a scanning device according to the invention is characterized in that one side of at least one of the first and the second lens has an aspherical shape. The aspherical shape provides sufficient freedom of design for realizing the strict requirements imposed on the objective system by a scanning device for optically readable record carriers. The aspherical shape may be obtained by means of a lacquer layer on the boundary face or the spherical surface of the lens by means of a known and conventional replica process.

A particular embodiment of a scanning device according to the invention is characterized in that at least one of the first and the second lens body comprises a transparent material having an Abbe number which is larger than 63. Due to the high Abbe number, the wavelength dependence of the focal length of the objective system can be reduced in such a way that the wavelength variation during switching between write and read power of a semiconductor laser leads to an acceptably small defocusing.

The objective system can be manufactured at lower cost when the first and the second lens body comprise the same transparent material. The number of degrees of freedom of the objective system is then still sufficiently large to realize the desired optical properties.

A particular embodiment of a scanning device according to the invention is characterized in that at least one of the first and the second lens body comprises a transparent material having a refractive index which is smaller than 1.54. A relatively low refractive index of the material of the lens body leads to a lens body having a relatively small thickness on the optical axis and therefore a relatively small mass. A lighter lens body yields an increase of the bandwidth of the actuators which are used to keep the scanning spot formed by the objective system in focus and on the track. Moreover, materials having a low refractive index are less expensive than materials having a high refractive index.

A special embodiment of an optical scanning device according to the invention is suitable for writing and erasing magneto-optical record carriers and is provided with a magnet coil for this purpose. The magnet coil is preferably arranged on the second boundary face of the second lens. The thickness on the optical axis of the second lens is preferably larger than half the diameter of the lens body so as to obtain the advantages of positioning according to the invention.

In a special embodiment of a scanning device according to the invention, the magnet coil is countersunk in the second lens so as to reduce the total thickness of the lens with the magnet coil. To this end, the second boundary face has a central boundary face and a peripheral boundary face shifted along the optical axis, the magnet coil is arranged on the peripheral boundary face, and the part of the second lens which is bounded by the plane of the peripheral boundary face comprises more than half of the second spherical lens body. The central boundary face constitutes an end face of a portion of the second lens situated on the optical axis, which portion projects from the plane of the peripheral boundary face and is surrounded by the magnet coil. The thickness on the optical axis of the second lens is the thickness as is required for the optical design of the objective system. The diameter of the projecting portion is sufficiently large to pass the converging radiation beam through the lens without vignetting.

A particular embodiment of a scanning device according to the invention is provided with a lens holder comprising a fitting for the second lens with a centerline and an inner diameter, the centerline substantially coinciding with the optical axis, and the fitting extending along the optical axis in a direction from the first to the second lens up to beyond the center of the second lens body, the magnet coil being secured on a side of the fitting remote from the first lens and having an inner diameter which is substantially equal to the inner diameter of the fitting. The second lens may be positioned on the well-defined inner side of the fitting, while the less well-defined inner side of the magnet coil does not have any influence on the position of the second lens. Due to the positioning directly around the second lens, the magnet coil has a relatively small inner diameter so that a relatively large magnetic field is generated.

An objective system according to the invention is characterized in that the first and the second lens comprise more than one half of the first and the second spherical lens body, respectively.

An optical player according to the invention is characterized in that the optical scanning device is an optical scanning device as described hereinbefore.

These and other aspects of the invention are apparent from and will be elucidated with reference to the embodiments described hereinafter.

DETAILED DESCRIPTION OF THE INVENTION

Figure 1:
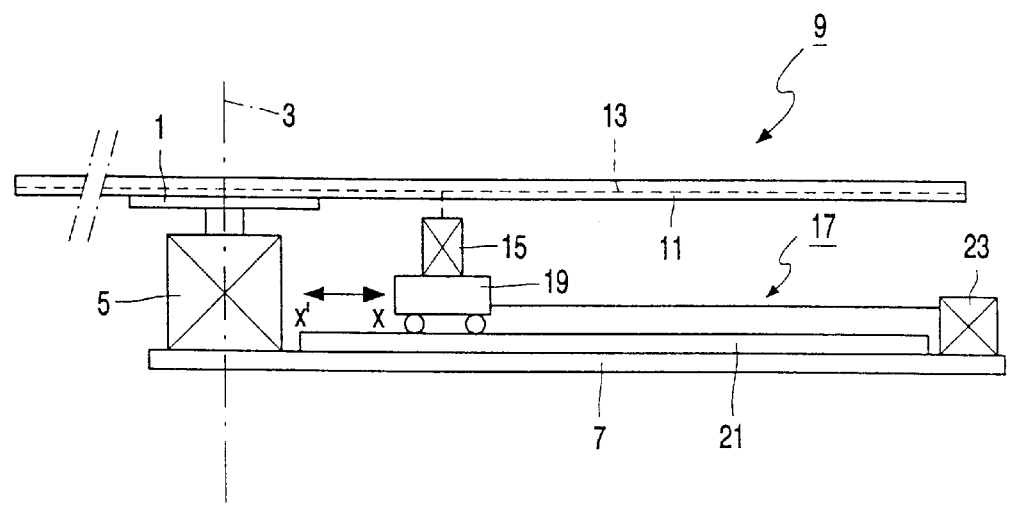
FIG. 1 shows diagrammatically an optical player according to the invention.

The embodiment of an optical player according to the invention, shown diagrammatically in FIG. 1, comprises a table 1 which is rotatable about an axis of rotation 3 and can be driven by an electric motor 5 secured to a frame 7. An optically readable record carrier 9 such as, for example, a DVD can be placed on the table 1, which record carrier is provided with a disc-shaped transparent substrate on which an information layer 13 having a spiral information track is present. The information layer 13 is coated with a transparent protective layer 11. The optical player further comprises an optical scanning device 15 according to the invention for optically scanning the information track of the record carrier 9. The scanning device 15 can be displaced substantially in two opposite radial directions X and X' with respect to the axis of rotation 3 by means of a displacement device 17 of the optical player. To this end, the scanning device 15 is secured to a slide 19 of the displacement device 17 which is further provided with a straight guiding means 21 provided on the frame 7 and extending parallel to the X direction, across which guiding means the slide 19 can be displaced, and an electric motor 23 with which the slide 19 is displaceable across the guiding means 21. During operation, the motors 5 and 23 are driven by an electric control unit (not shown) of the optical player, and the record carrier 9 is thereby rotated about the axis of rotation 3 while simultaneously the scanning device 15 is displaced parallel to the X direction in such a way that the spiral information track on the record carrier 9 is scanned by the scanning device 15. During scanning, information present on the information track can be read by the scanning device 15, or information can be written on the information track by the scanning device 15.

Figure 2:
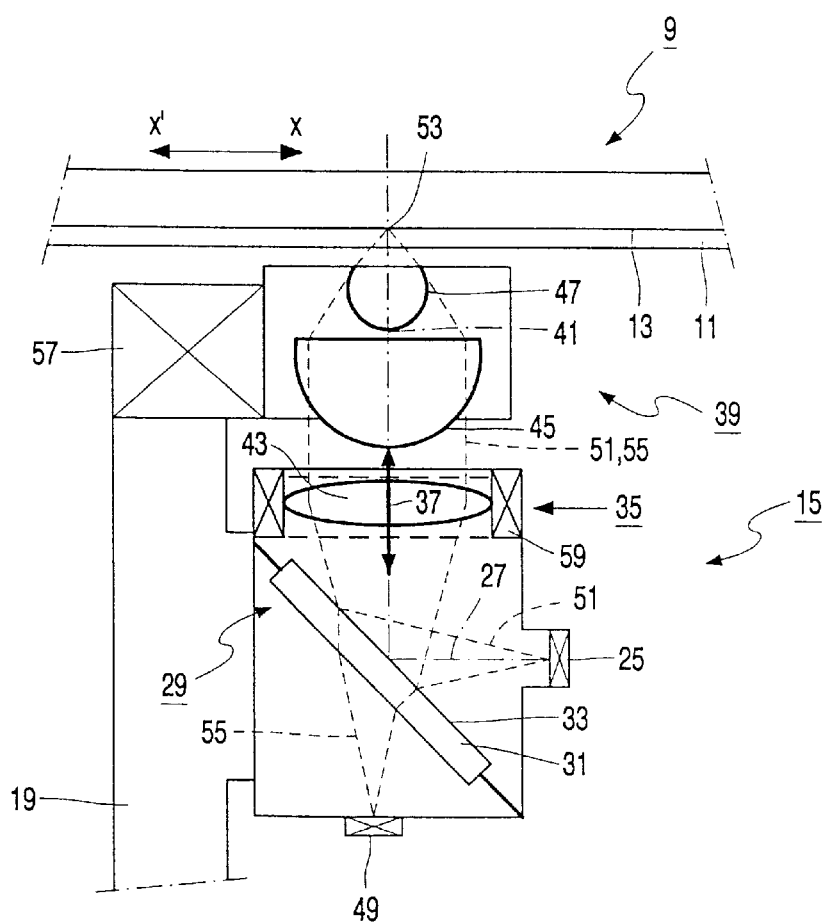
FIG. 2 shows diagrammatically an optical scanning device according to the invention, used in the optical player shown in FIG. 1, FIGS. 3, 4, 5 and 6 are diagrammatic cross-sections of a first, a second, a third and a fourth embodiment, respectively, of a lens system according to the invention, suitable for use in the scanning device shown in FIG. 2.

The optical scanning device 15 according to the invention, used in the optical player according to the invention is shown diagrammatically in FIG. 2. The scanning device 15 comprises a radiation source 25 such as, for example, a semiconductor laser with an optical axis 27. Moreover, the scanning device 15 comprises a beam splitter 29 which comprises a transparent plate 31 having a reflective surface 33 facing the radiation source 25, which transparent plate is arranged at an angle of 45° with respect to the optical axis 27 of the radiation source 25. Furthermore, the scanning device 15 comprises a collimator lens unit 35 with an optical axis 37 and an optical lens system 39 according to the invention, with an optical axis 41, the collimator lens unit 35 being arranged between the beam splitter 29 and the lens system 39. In the embodiment shown, the collimator lens unit 35 comprises a single collimator lens 43, while the lens system 39 comprises a first lens, or objective lens 45, and a second lens, or auxiliary lens 47, arranged between the objective lens 45 and the record carrier 9. In the embodiment shown, the optical axis 37 of the collimator lens unit 35 and the optical axis 41 of the lens system 39 coincide and enclose an angle of 90° with respect to the optical axis 27 of the radiation source 25. The scanning device 15 further comprises an optical detector 49 of a known and conventional type, arranged behind the beam splitter 29 with respect to the collimator lens unit 35.

During operation, the radiation source 25 generates a radiation beam 51 which is reflected by the reflective surface 33 of the beam splitter 29 and is focused by the lens system 39 to a scanning spot 53 on the information layer 13 of the record carrier 9. The radiation beam 51 is reflected by the information layer 13 to a reflected radiation beam 55 which is focused on the optical detector 49 via the lens system 39, the collimator lens unit 35 and the beam splitter 29. For reading information present on the record carrier 9, the radiation source 25 generates a continuous or pulsed radiation beam 51, while the optical detector 49 supplies a detection signal which corresponds to a series of consecutive elementary information marks present in the scanning spot 53 on the information track of the record carrier 9. For writing information on the record carrier 9, the radiation source 25 generates a radiation beam 51 having a power which corresponds to the information to be written, while a series of consecutive elementary information marks is generated in the scanning spot 53 on the information track of the record carrier 9. It is to be noted that the scope of the invention also comprises optical scanning devices in which the radiation source 25, the collimator lens unit 35 and the lens system 39 are arranged in a different manner with respect to each other. For example, the invention comprises embodiments in which the optical axis 37 of the collimator lens unit 35 and the optical axis 41 of the lens system 39 mutually enclose an angle of 90°, and in which a mirror is arranged between the collimator lens unit 35 and the lens system 39. In these embodiments, the optical scanning device has reduced dimensions as viewed parallel to the optical axis 41 of the lens system 39. The invention also comprises, for example, embodiments in which the radiation source 25 and the collimator lens unit 35 are not arranged on the slide 19 but in a fixed position with respect to the frame 7, and in which the optical axis 37 of the collimator lens unit 35 is directed parallel to the radial directions X, X'. In these embodiments, only the lens system 39 and an additional mirror are arranged on the slide 19 so that the displaceable mass of the slide 19 is reduced.

As is further shown in FIG. 2, the optical scanning device 15 comprises a first actuator 57 and a second actuator 59. The lens system 39 is displaceable through relatively small distances parallel to the optical axis 41 and through relatively small distances parallel to the X direction by means of the first actuator 57. By displacing the lens system 39 parallel to the optical axis 41 by means of the first actuator 57, the scanning spot 53 is focused with a desired accuracy on the information layer 13 of the record carrier 9. By displacing the lens system 39 parallel to the X direction by means of the first actuator 57, the scanning spot 53 is maintained with a desired accuracy on the information track to be tracked. To this end, the first actuator 57 is driven by said control unit of the optical player receiving both a focus error signal and an error tracking signal from the optical detector 49. The collimator lens 43 of the collimator lens unit 35 is displaceable through relatively small distances parallel to the optical axis 37 by means of the second actuator 59. By displacing the collimator lens 43 parallel to the optical axis 37 by means of the second actuator 59, spherical aberration of the radiation beam 51 caused by the transparent protective layer 11 of the record carrier 9 can be corrected. Such a spherical aberration is mainly caused by fluctuations of the thickness of the protective layer 11. By means of an electric control current, the second actuator 59 is driven by said control unit of the optical player which receives an error signal from a sensor (not shown) with which, for example, the thickness of the transparent protective layer 11 proximate to the scanning spot 53 can be measured. The control unit is adapted to control the electric current through the second actuator 59 in such a way that the collimator lens 43 can be positioned in a position where said spherical aberration is corrected in a predetermined, known and conventional manner.

Figure 3:
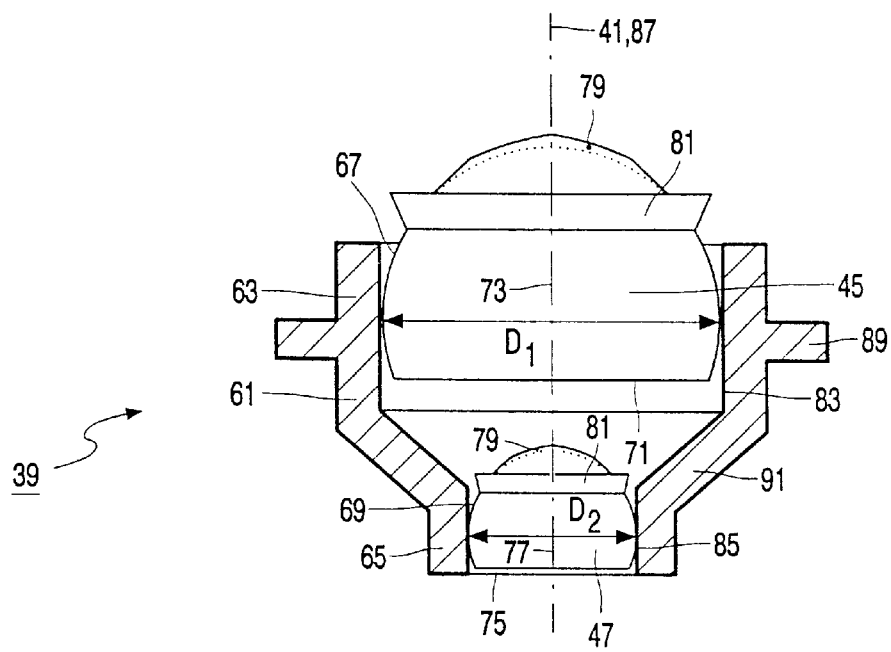

The optical lens system 39 according to the invention is shown in detail in FIG. 3. The lens system 39 comprises a lens holder 61 and an objective system. The objective system comprises the first lens 45 and the second lens 47. The lens holder 61 has a first fitting 63 for the first lens, or objective lens 45, and a second fitting 65 for the second lens, or auxiliary lens 47. The objective lens 45 and the auxiliary lens 47 comprise a part of a substantially spherical first lens body 67 having a first diameter $D_1$ and a substantially spherical second lens body 69, respectively, having a second diameter $D_2$ which is smaller than $D_1$. The first lens body 67 has a boundary face 71 on a side facing the auxiliary lens 47, so that a centerline of the first lens body 67 directed perpendicularly to the boundary face 71 constitutes an optical axis 73 of the objective lens 45. The second lens body 69 has a boundary face 75 on a side remote from the objective lens 45, so that a centerline of the second lens body 69 directed perpendicularly to the boundary face 75 constitutes an optical axis 77 of the auxiliary lens 47. The two lens bodies 67 and 69 are provided with a lacquer layer 79 by means of a known and conventional replica process on their side remote from the boundary face 71, 75, so that an aspherical lens surface is obtained. The reference numeral 81 on the objective lens 45 and the auxiliary lens 47 denotes a superfluous quantity of lacquer which is left on the relevant lens body 67, 69 after the replica process.

A specific embodiment of the optical lens system 39 changes the parallel radiation beam 51 having a wavelength of 400 nm to a converging beam having a numerical aperture (NA) of 0.85 which forms the scanning spot 53 on the information layer 13 through the protective layer 11 of the record carrier 9. The free working distance between the optical lens system 39 and the protective layer 11 is 0.15 mm, while the protective layer 11 has a thickness of 0.1 mm and a refractive index n=1.624 at said wavelength of the radiation beam 51. The first lens 45 of the optical lens system 39 has a diameter of 4.14 mm, a thickness of 2.319 mm on the optical axis 73 and an entrance pupil diameter of 3.0 mm. The lens body 67 of the first lens 45 is made of Schott glass FK 5 having a refractive index of 1.499 and an Abbe number of 70. The convex surface of the first lens 45 facing the collimator lens 43 has a radius of curvature of 2.07 mm. The aspherical shape of the convex surface is realized by means of a thin acrylic lacquer layer 79 provided on the first spherical lens body 67. The lacquer of the lacquer layer 79 has a refractive index of 1.595 and the lacquer layer 79 on the optical axis 73 has a thickness of 19 micrometers. The rotationally symmetrical aspherical shape is given by the equation:

$$z(r) = \sum_{i=1}^{8} A_{2i} r^{2i}$$

in which z is the position of the surface in the direction of the optical axis 73 in millimeters, r is the distance to the optical axis 73 in millimeters, and $A_k$ is the coefficient of the $k^{th}$ power of r. The values of the coefficients $A_2$ to $A_{16}$ are 0.2643886, 0.008869125, $-3.3763645 \ 10^{-6}$, 0.0014305415, $-0.0013369808$, 0.0006112074, $-0.00014547052$ and $1.2928731 \ 10^{-5}$, respectively. The boundary face 71 of the first lens 45 opposite the convex surface has an infinite radius of curvature. The second lens 47 of the optical lens system 39 has a diameter of 1.7 mm, a thickness of 0.977 mm on the optical axis 77 and a distance of 0.356 mm to the first lens 45. The lens body 69 of the second lens 47 is also made of Schott glass FK 5. The convex surface of the second lens 47 directed towards the first lens 45 has a radius of curvature of 0.85 mm. The aspherical shape of the convex surface is given by the above-mentioned equation, in which the values of the coefficients $A_2$ to $A_{16}$ are 0.6052026, 0.21991899, 0.12419616, 0.023176954, 0.15057964, 0.56573255, $-1.2308544$ and 0.73899785, respectively. The aspherical shape is realized with an acrylic lacquer layer 79 which has a thickness of 7 micrometers on the optical axis 77. The boundary face 75 on the other side of the second lens 47 has an infinite radius of curvature. The overall weight of the first and the second lens is 53 grams. The chromatic displacement of the free working distance of the objective system is only 0.18 micrometer/nanometer. The decentering of the first and the second lens must be smaller than 14 μm. The angle between the optical axes of the two lenses must be smaller than 0.7 mrad. The radii of the lens bodies of the first and the second lens should not deviate more than 40 micrometers from the nominal values of the radii. This objective system, whose optical properties must comply with stringent requirements, which become manifest, inter alia, in said narrow tolerances, can be manufactured in a relatively simple way by means of the measures according to the invention.

For obtaining a correct optical operation of the lens system 39, the optical axes 73, 77 of the objective lens 45 and the auxiliary lens 47, viewed perpendicularly to the optical axis 41 of the lens system 39, should coincide within very accurate tolerances and should be parallel. According to the invention, said tolerances are obtained in a relatively simple manner in that the first fitting 63 and the second fitting 65 of the lens holder 61 have a first circular-cylindrical inner wall 83 and a second circular-cylindrical inner wall 85, respectively, with a common centerline 87 coinciding with the optical axis 41, the first inner wall 83 having a diameter which is substantially equal to the first diameter $D_1$, and the second inner wall 85 having a diameter which is substantially equal to the second diameter $D_2$. Furthermore, the objective lens 45 and the auxiliary lens 47 comprise more than one half of the first spherical lens body 67 and the second spherical lens body 69, respectively, i.e., viewed parallel to the optical axes 73 and 77, the objective lens 45 and the auxiliary lens 47 have a height which is larger than $D_1/2$ and $D_2/2$, respectively. Consequently, the objective lens 45 and the auxiliary lens 47 have a circular circumference with a diameter which is equal to $D_1$ and $D_2$, respectively, so that the objective lens 45 and the auxiliary lens 47, viewed perpendicularly to the centerline 87, are accurately surrounded by the first inner wall 83 and the second inner wall 85, respectively, and consequently centered accurately with respect to the centerline 87 and with respect to each other. When manufacturing the lens system 39, the inner walls 83 and 85 can be provided accurately in the lens holder 61 by means of a conventional tool such as a lathe. Subsequently, the auxiliary lens 47 is first arranged and secured in the second fitting 65. In the embodiment shown, the auxiliary lens 47 is secured in the second fitting 65 by means of a press fit of the second spherical lens body 69 in the second inner wall 85. However, the auxiliary lens 47 may be alternatively secured in the second fitting 65 in a different manner, for example, by means of a glue. Subsequently, the objective lens 45 is arranged in the first fitting 63, so that the objective lens 45 is centered with respect to the auxiliary lens 47 in directions perpendicular to the centerline 87. The optical axis 73 of the objective lens 45 is subsequently aligned parallel to the optical axis 77 of the auxiliary lens 47 by means of a known and conventional interferometric aligning process. In this process, the objective lens 45 is tilted by means of a known and conventional manipulator through a limited angle about a tilt axis extending perpendicularly to the centerline 87. Since the objective lens 45 comprises more than half of the spherical lens body 67, the objective lens 45 remains completely in contact with the first inner wall 83 during tilting, so that the accurate mutual centering of the objective lens 45 and the auxiliary lens 47 in directions perpendicular to the centerline 87 is not influenced when the objective lens 45 is being tilted. The objective lens 45 is finally secured in the first fitting 63 by means of a glue. As is further shown in FIG. 3, the first fitting 63 and the second fitting 65 of the lens holder 61 are substantially bush-shaped, the first fitting 63 having an annular flange 89 with which the lens holder 61 is secured to the first actuator 57. The bush-shaped fittings 63, 65 are interconnected through a hollow cone-shaped central part 91 so that the lens holder 61 has a very satisfactory rigidity and accuracy of shape. The mutual positions of the objective lens 45 and the auxiliary lens 47 are substantially not influenced by forces of acceleration.

Figure 4:
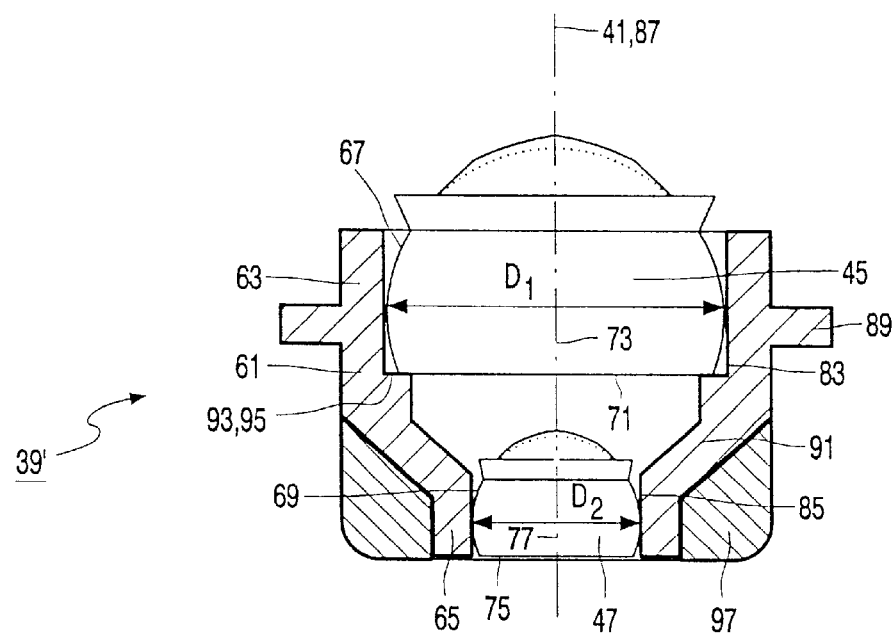

The second embodiment of a lens system 39' according to the invention, shown in FIG. 4, is also suitable for use in the scanning device 15, instead of the lens system 39 described hereinbefore. In FIG. 4, components of the lens system 39' corresponding to components of the lens system 39 are denoted by the same reference numerals. Only some aspects of the lens system 39' deviating from the lens system 39 will be described hereinafter.

As is shown in FIG. 4, the first fitting 63 of the lens holder 61 of the lens system 39' is provided with an abutment 93 for the boundary face 71 of the objective lens 45. In the embodiment shown, the abutment 93 comprises an annular face 95 extending perpendicularly to the centerline 87 and connecting the first inner wall 83 and the second inner wall 85 in a step-shaped manner. However, the abutment 93 may be formed in a different manner, for example, in the form of three abutting faces each extending perpendicularly to the centerline 87 in a common imaginary plane. Since the annular face 95 extends perpendicularly to the centerline 87, and the boundary face 71 of the objective lens 45 engages the annular face 95, the optical axis 73 of the objective lens 45 extends accurately parallel to the centerline 87. As is further shown in FIG. 4, an annular body 97 is arranged around the second fitting 65 and the cone-shaped central part 91, which annular body is made of an elastic material such as polyethylene and serves as a bumper to prevent damage of the record carrier 9 due to mechanical contact between the lens system 39' and the record carrier 9.

The scanning device according to the invention may be used for writing and erasing information on a magneto-optical record carrier when the scanning device is provided with a magnet coil for generating a magnetic field at the location of the scanning spot 53. The magnet coil in the lens system 39' may be wound around the second fitting 65, as is shown in FIG. 4, where it replaces a part of the annular body 97 or with which it is integrated.

Figure 5:
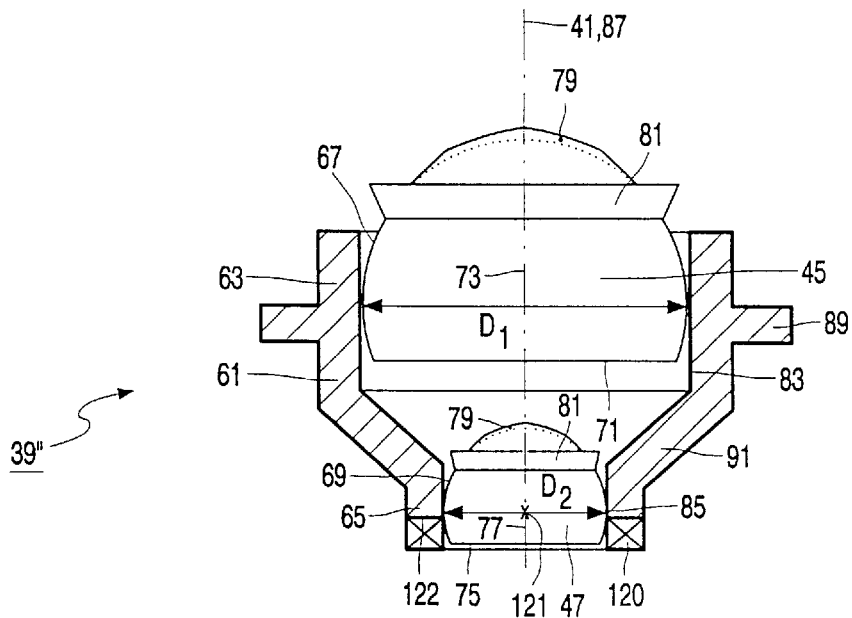

FIG. 5 shows a third embodiment of a lens system 39" according to the invention, in which a magnet coil 120 is placed under the second fitting 65 and secured to a side 122 of the second fitting 65 remote from the first lens 45. The second fitting 65 extends below the center 121 of the auxiliary lens 47. Consequently, the auxiliary lens 47 can be positioned and fixed on the well-defined second inner wall 85 of the second fitting 65, whereas the less well-defined inner side of the magnet coil 120 has no influence on the positioning of the auxiliary lens 47. By placing the magnet coil under the second fitting, the inner diameter of the magnet coil can become smaller than in the case where the magnet coil is wound around the second fitting. The smaller inner diameter increases the magnetic field at the location of the scanning spot. Although the magnet coil 120 shown in the Figure has the same outer diameter as the second fitting 65, the magnet coil may have a larger diameter, which may be desirable for generating the required magnetic field. The magnet coil 120 may be integrated with a body 97 functioning as a bumper, as is shown in FIG. 4.

Figure 6:
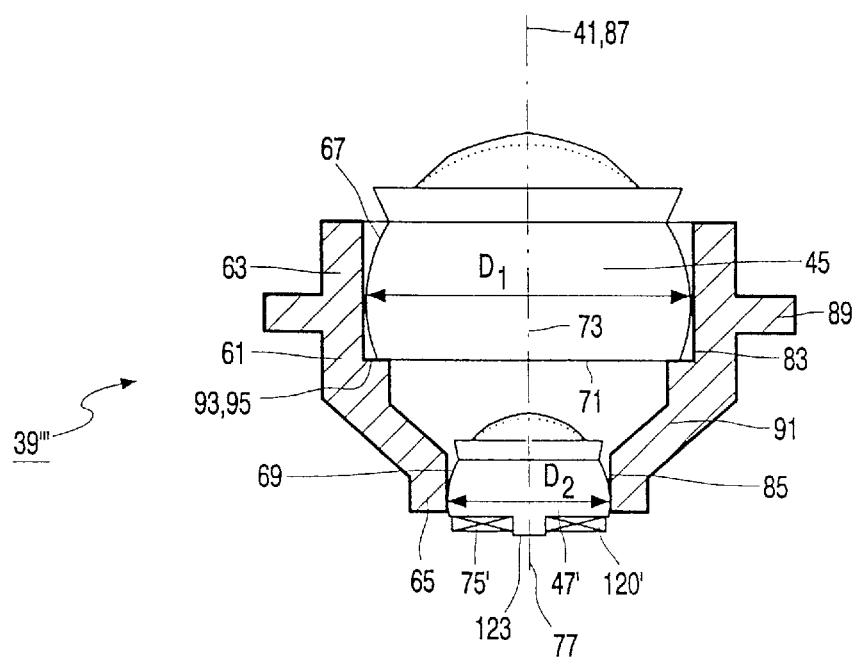

FIG. 6 shows a fourth embodiment of a lens system 39' according to the invention, in which a magnet coil 120' is placed under an auxiliary lens 47'. The auxiliary lens 47' has a central boundary face 123, such that the lens on the optical axis 41 has the same thickness as the auxiliary lens 47 shown in FIG. 5. A boundary face 75' of the auxiliary lens which is recessed with respect to the central boundary face 123 is arranged outside the part of the auxiliary lens 47' through which the radiation beam 51 passes. The recess is such that the spherical portion of the lens body has a height which is larger than $D_2/2$ so that the auxiliary lens 47' engages the inner wall 85 with the circular circumference with a diameter of $D_2$. Consequently, the positioning of the auxiliary lens according to the invention remains possible. The magnet coil 120' is arranged on the peripheral boundary face 75'. The magnet coil has such a height that it does not project under the central boundary face 123. The outer diameter of the magnet coil is preferably smaller than the diameter of the inner wall 85 in the case where the fitting 65 extends as far as the height of the coil. The outer diameter of the magnet coil may be larger than the diameter of the inner wall 85 in the case where the fitting 65 does not project under the boundary face 75'. The magnet coil 120' may be formed by a wire winding or by a vapor-deposited metal track, for example, in the form of a spiral. The small thickness of a vapor-deposited metal track provides the possibility of rendering the height of the central boundary face 123 and the peripheral boundary face 75' equal, which improves the possibilities of manufacturing the auxiliary lens 47'.

Figure 7:
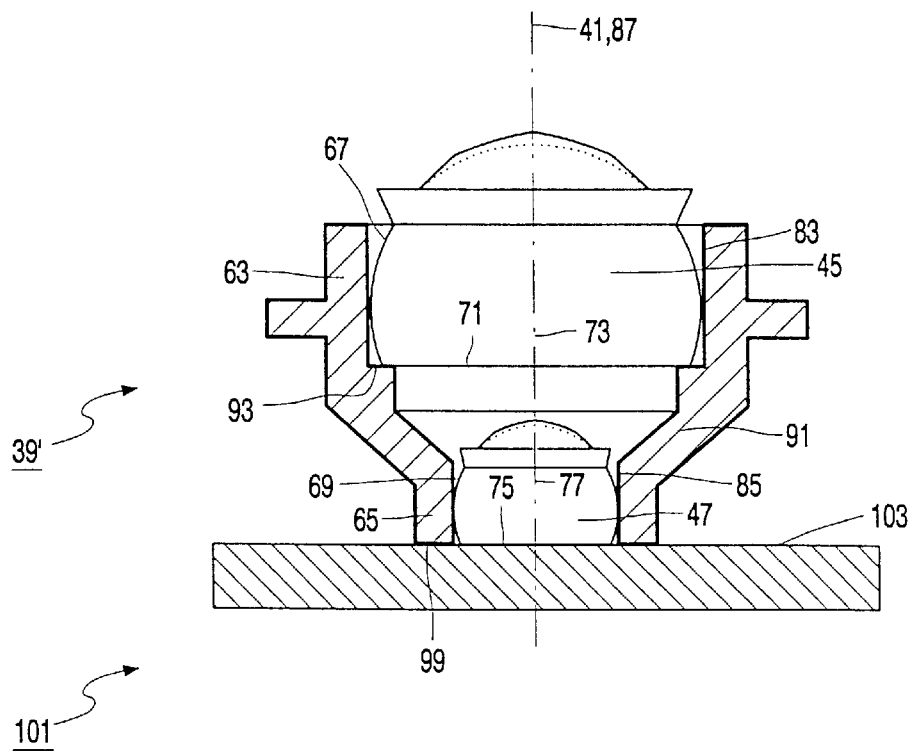
FIG. 7 shows diagrammatically an aligning tool used in the manufacture of the lens system shown in FIG. 4 by means of a method according to the invention.

FIG. 7 shows diagrammatically a method of aligning the auxiliary lens 47 of the lens system 39' shown in FIG. 4 with respect to the objective lens 45. As described hereinbefore, the optical axis 73 of the objective lens 45 is in an accurate position parallel to the centerline 87 because the boundary face 71 of the objective lens 45 engages the abutment 93 extending perpendicularly to the centerline 87. In accordance with the method shown in FIG. 7, the second fitting 65 of the lens holder 61 is provided on a side remote from the objective lens 45 with an annular end face 99 extending perpendicularly to the centerline 87. The auxiliary lens 47 is positioned in the second fitting 65 by means of an aligning tool 101 which has a single alignment face 103. The auxiliary lens 47 is positioned in the second fitting 65 by simultaneously supporting the boundary face 75 of the auxiliary lens 47 and the end face 99 of the lens holder 61 by means of the alignment face 103 of the aligning tool 101. Since the end face 99 extends perpendicularly to the centerline 87, the optical axis 77 of the auxiliary lens 47 is thus positioned in an accurate position parallel to the centerline 87 and consequently aligned accurately with respect to the optical axis 73 of the objective lens 45. The boundary face 75 of the auxiliary lens 47 and the end face 99 of the lens holder 61 are thus situated in a common plane. The aligning tool 101 required in accordance with the method has a very simple structure. In addition to the two circular-cylindrical inner walls 83 and 85, the lens holder 61 should be provided with the abutment 93 extending perpendicularly to the centerline 87 and the end face 99 extending perpendicularly to the centerline 87. The abutment 93 and the end face 99 may be arranged accurately by means of conventional tools such as a lathe, while the abutment 93 and the two inner walls 83 and 85 may be provided in a single process step. The required accuracy is thus obtained by means of the method according to the invention in a relatively simple way.

Figure 8:
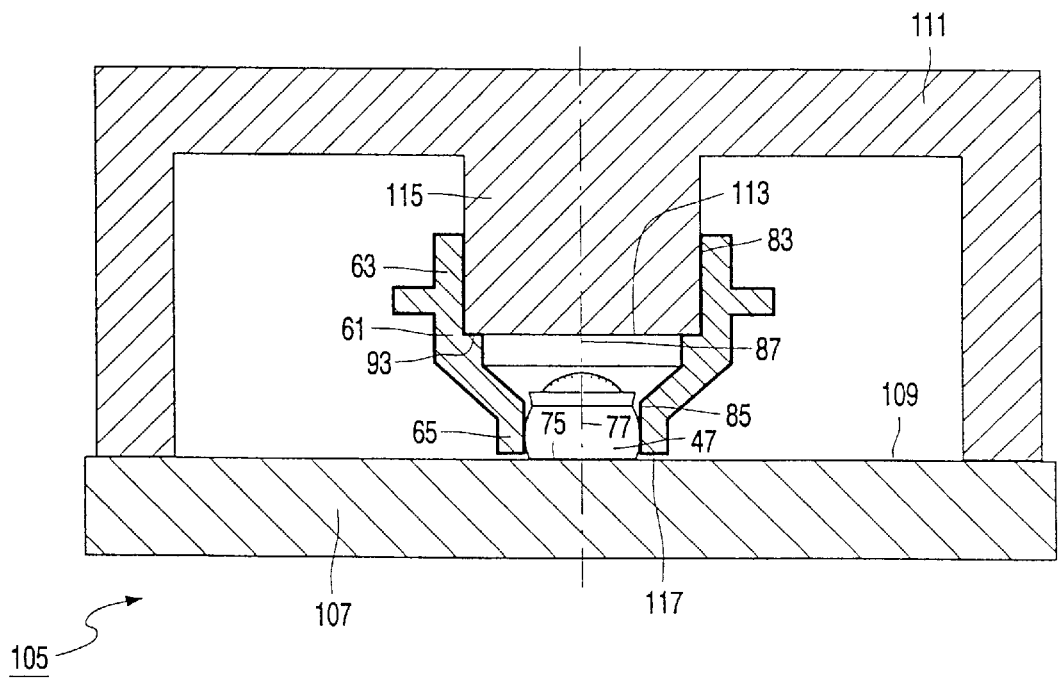
FIG. 8 shows diagrammatically an aligning tool used in the manufacture of the lens system shown in FIG. 4 by means of an alternative method according to the invention.

FIG. 8 shows diagrammatically how the auxiliary lens 47 of the lens system 39' shown in FIG. 4 is aligned with respect to the centerline 87. First, the auxiliary lens 47 and then the objective lens 45 is arranged in the lens holder 61 in accordance with this alternative method. The auxiliary lens 47 is positioned in the second fitting 65 by means of an aligning tool 105 having a first part 107 with a first alignment face 109 and a second part 111 with a second alignment face 113. The second alignment 113 is an end face of a circular-cylindrical mandrel 115 which belongs to the second part 111. In an assembled state of the first part 107 and the second part 111 of the aligning tool 105, shown in FIG. 8, the two alignment faces 109 and 113 are accurately parallel. In accordance with the alternative method, the first fitting 63 of the lens holder 61 is placed on the mandrel 115 so that the abutment 93 of the first fitting 63 is supported by the second alignment face 113. The auxiliary lens 47 is positioned in the second fitting 65 by means of the first alignment face 109, with the boundary face 75 of the auxiliary lens 47 being supported by the first alignment face 109. In the assembled state of the aligning tool 105, shown in FIG. 8, a free space 117 is present between the first alignment face 109 and the second fitting 65, so that the position of the first alignment face 109 with respect to the second alignment face 113 is not influenced by the presence of the second fitting 65. The boundary face 75 of the auxiliary lens 47 is thus accurately positioned parallel to the abutment 93 so that the optical axis 77 of the auxiliary lens 47 is accurately aligned parallel to the centerline 97. By subsequently positioning the boundary face 71 of the objective lens 45 against the abutment 93, the optical axis 73 of the objective lens 45 is also brought to an accurate position parallel to the centerline 87 and thus accurately aligned with respect to the optical axis 77 of the auxiliary lens 47. The aligning tool 105 required in accordance with this alternative method has a less simple structure than the aligning tool 101 shown in FIG. 7. An advantage of the alternative method is, however, that, in addition to the two circular-cylindrical inner walls 83 and 85, the lens holder 61 only needs to be provided with the abutment 93 extending perpendicularly to the centerline 87. The abutment 93 and the inner walls 83, 85 may be accurately provided in a single process step by means of a conventional tool such as a lathe, so that the alternative method is also relatively simple. Since the free space 117 in the assembled state of the aligning tool 105 shown in FIG. 8 is present between the first alignment face 109 and the second fitting 65, the boundary face 75 of the auxiliary lens 47 projects through a small distance from the second fitting 65 after manufacture of the lens system 39'.

This may be prevented, for example, by providing the first part 107 of the aligning tool 105 with a circular alignment face which is raised with respect to the first part 107 and has a diameter which is smaller than the second diameter $D_2$ of the second fitting 65, so that the boundary face 75 is countersunk in the second fitting 65.

Information which is present on the information layer 13 can be read or erased, or information can be written on the information layer 13 by means of the above-described optical player according to the invention during scanning of the information layer 13 of the record carrier 9. It is to be noted that the invention also relates to optical players with which information present on an information layer of a record carrier can only be read.

It is to be noted that the invention also comprises embodiments in which at least one of the two fittings 63, 65 of the lens holder 61 has an inner wall which is not completely circular-cylindrical and, viewed parallel to the centerline 87, has a constant diameter, as in the embodiments described above, but is only partly circular-cylindrical or, viewed parallel to the centerline 87, has a constant diameter through a limited distance. In such embodiments, the relevant lens is arranged between the circular-cylindrical part of the inner wall with the constant diameter.

It is also to be noted that the objective lens of the objective system may comprise more than half of a spherical body and the auxiliary lens may comprise half or less than half of a spherical body. The advantages of positioning the objective lens, obtained by the spherical shape, simplify the alignment of the objective system.

Finally, it is to be noted that the assembly of the magnet coil and the second lens as shown in FIGS. 5 and 6 may also be used in an objective system comprising only the second lens and in an objective system comprising one or more other lenses in addition to the second lens, in which at least the second lens comprises more than half of a spherical lens body. The space around the second lens under the center of the second lens is not required for positioning or fixing the second lens in the fitting and is available for the magnet coil.

What is claimed is:

1. An optical scanning device for scanning an information layer of an optically readable record carrier, which scanning device comprises:
    a radiation source; and
    an objective system with an optical axis and for focusing a radiation beam, supplied in operation by the radiation source, to a scanning spot on the information layer, the objective system being provided with:
    a first lens comprising a part of a first, substantially spherical lens body with a first center and a first diameter; and
    a second lens comprising a part of a second, substantially spherical lens body with a second center and a second diameter which is smaller than the first diameter, the first and the second center being situated substantially on the optical axis, the first and the second lens comprise more than one half of the first and the second spherical lens body, respectively.

2. An optical scanning device as claimed in claim 1, wherein at least one of the first and the second lens is bounded on one side by a boundary face extending perpendicularly to the optical axis.

3. An optical scanning device as claimed in claim 1, wherein the first and the second lens are secured in a fixed position with respect to each other.

4. An optical scanning device as claimed in claim 1, wherein a side of at least one of the first and the second lens has an aspherical shape.

5. An optical scanning device as claimed in claim 1, wherein at least one of the first and the second lens body comprises a transparent material having an Abbe number which is larger than 63.

6. An optical scanning device as claimed in claim 1, wherein the first and the second lens body comprise the same transparent material.

7. An optical scanning device as claimed in claim 1, wherein at least one of the first and the second lens body comprises a transparent material having a refractive index which is smaller than 1.54.

8. An optical scanning device as claimed in claim 1, wherein a magnet coil is arranged on the second boundary face.

9. An optical scanning device as claimed in claim 8, wherein the second boundary face has a central boundary face and a peripheral boundary face shifted along the optical axis, the magnet coil is arranged on the peripheral boundary face, and the part of the second lens which is bounded by the plane of the peripheral boundary face comprises more than half of the second spherical lens body.

10. An optical scanning device as claimed in claim 1, provided with a magnet coil and a lens holder comprising a fitting for the second lens with a centerline and an inner diameter, the centerline substantially coinciding with the optical axis, and the fitting extending along the optical axis in a direction from the first to the second lens up to beyond the center of the second lens body, the magnet coil being secured on a side of the fitting remote from the first lens and having an inner diameter which is substantially equal to the inner diameter of the fitting.

11. An objective system provided with:
a first lens comprising a part of a first, substantially spherical lens body with a first center and a first diameter, and
a second lens comprising a part of a second, substantially spherical lens body with a second center and a second diameter which is smaller than the first diameter, the first and the second center being situated substantially on a centerline, the first and the second lens comprise more than one half of the first and the second spherical lens body, respectively, at least one of the first and the second lens comprise less than the entire sphere of the first and second lens body, respectively.

12. An optical player provided with:
a table which is movable in a given direction of movement;
an optical scanning device for scanning an information layer of an optically readable record carrier which can be placed on the table; and
a displacement device with which at least an objective system of the scanning device is movable in a direction substantially perpendicular to the direction of movement of the table; and
wherein the optical scanning device includes:
a radiation source; and
an objective system with an optical axis and for focusing a radiation beam, supplied in operation by the radiation source, to a scanning spot on the information layer, the objective system being provided with:
a first lens comprising a part of a first, substantially spherical lens body with a first center and a first diameter; and
a second lens comprising a part of a second, substantially spherical lens body with a second center and a second diameter which is smaller than the first diameter, the first and the second center being situated substantially on the optical axis, the first and the second lens comprise more than one half of the first and the second spherical lens body, respectively.

* * * * *